J. SCOTT.
PROTECTING SHIELD FOR USE IN BAKING PASTRY.
APPLICATION FILED OCT. 2, 1920.

1,375,539.

Patented Apr. 19, 1921.

Inventor,
Jennie Scott.
by A. S. Johnson
his Attorney.

UNITED STATES PATENT OFFICE.

JENNIE SCOTT, OF ST. PAUL, MINNESOTA.

PROTECTING-SHIELD FOR USE IN BAKING PASTRY.

1,375,539.     Specification of Letters Patent.     Patented Apr. 19, 1921.

Application filed October 2, 1920. Serial No. 414,178.

*To all whom it may concern:*

Be it known that I, JENNIE SCOTT, a citizen of the United States, residing at St. Paul, in the county of Ramsey and State of Minnesota, have invented certain new and useful Improvements in Protecting-Shields for use in Baking Pastry, of which the following is a specification.

This invention relates to devices for use in baking pastry, and more particularly to means for shielding certain parts of the article to be baked, for the purpose of retarding the process of baking at those parts.

In the baking of pies as, for instance those having a soft filling, such as custard or a lemon mixture, it is well known, that the surrounding edge of the pie will be completely baked a considerable period of time in advance of the center portion. To properly bake the center portion it becomes necessary to overbake the edges. This is also true of ordinary cake, especially when the latter is of thick dimension.

An object of my invention is to provide improved means for shielding the surrounding edges and a part of the top in a manner to retard or slow up baking thereat and at the same time maintain a circulation of air at those points.

Another object of my invention is to provide a device of the class described, which will be simple in construction and cheap of manufacture.

In the drawings:—

I have shown the device in the shape of a circular frame surrounding a central opening but it is to be understood that any other shape may be substituted.

As shown, the invention comprises an angle ring of which 1 designates the horizontally disposed inwardly extending leg constituting the top plate, and 2 the vertically disposed curved leg, constituting a surrounding wall.

Extending downwardly from the lower edge of the wall are preferably four supporting legs 3, whereby the ring is held in elevated position. A suitable handle 4 is provided whereby the device may be conveniently removed as desired.

Figure 1:
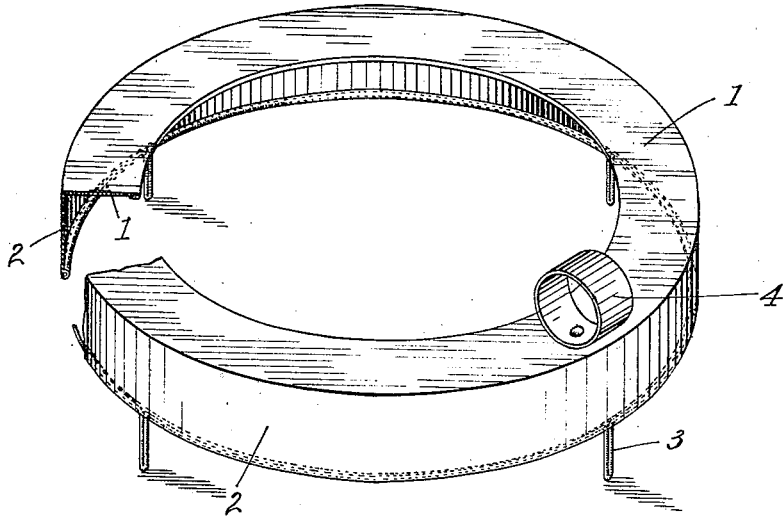
Figure 1 is a perspective view of the invention shown partly broken away.
Figure 2:
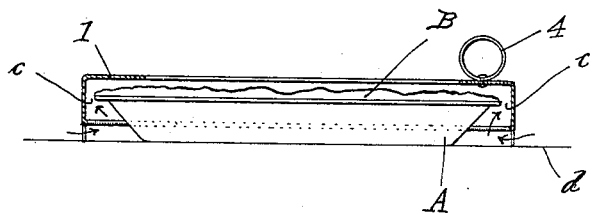
Fig. 2 is a vertical sectional view thereof shown on a reduced scale, showing the invention as it appears in use.

In Fig. 2, A designates a pie plate and B an unbaked pie.

The device is made sufficiently large to form a space as at *c*, around the pie plate, the legs 3 affording a space between the ring and the surface *d* upon which pie plate rests. Thus air may circulate as indicated by the arrows.

I claim:—

1. In a device of the class described the combination with a pie plate, of a frame spacedly surrounding the pie plate and constructed with a wall extending above and a distance spacedly over the top edge thereof.

2. In a device of the class described, the combination with a pie plate, of a frame positioned so as to loosely surround the pie plate and formed with a wall extending a distance over the top and side thereof, and means for supporting it so positioned.

In testimony whereof I affix my signature.

JENNIE SCOTT.